United States Patent
Fukui et al.

(10) Patent No.: US 6,905,390 B2
(45) Date of Patent: Jun. 14, 2005

(54) SKIN APPLICATION STRUCTURE FOR ROBOTS AND A ROBOT HAVING SUCH A STRUCTURE

(75) Inventors: Ikuma Fukui, Shiga (JP); Taizo Tahara, Shiga (JP); Toshihiro Tashima, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/267,696

(22) Filed: Oct. 10, 2002

(65) Prior Publication Data

US 2003/0110540 A1 Jun. 12, 2003

(30) Foreign Application Priority Data

Oct. 12, 2001 (JP) ........................................ 2001-315521

(51) Int. Cl.⁷ ............................................... A63H 13/02
(52) U.S. Cl. ...................................... 446/337; 446/342
(58) Field of Search ................................ 446/342, 341, 446/337, 392, 343, 393; 434/295, 296, 297; 623/4.1

(56) References Cited

U.S. PATENT DOCUMENTS

| | | | | |
|---|---|---|---|---|
| 2,706,364 A | * | 4/1955 | Yakooleff | 446/342 |
| 2,828,581 A | * | 4/1958 | Prupis | 446/346 |
| 3,043,051 A | * | 7/1962 | Beebe | 446/342 |
| 3,086,318 A | * | 4/1963 | Brudney | 446/342 |
| 3,757,465 A | * | 9/1973 | Barlow | 446/341 |
| 4,177,589 A | * | 12/1979 | Villa | 40/457 |
| 4,402,158 A | * | 9/1983 | Seki et al. | 446/198 |
| 4,761,150 A | * | 8/1988 | Lautenberger et al. | 446/345 |
| 4,777,938 A | * | 10/1988 | Sirota | 600/27 |
| 4,900,289 A | * | 2/1990 | May et al. | 446/342 |
| 5,399,115 A | * | 3/1995 | Arad et al. | 446/342 |
| 5,679,050 A | * | 10/1997 | LLorens | 446/341 |
| 5,870,842 A | * | 2/1999 | Ogden et al. | 40/411 |
| 5,900,923 A | * | 5/1999 | Prendergast et al. | 351/221 |
| 5,966,853 A | * | 10/1999 | Yeh | 40/416 |
| 6,705,918 B1 | * | 3/2004 | Chang | 446/392 |

FOREIGN PATENT DOCUMENTS

| | | |
|---|---|---|
| JP | 1978/53-17446 | 2/1978 |
| JP | 1985/60-147491 | 9/1985 |
| JP | 1986/61-148390 | 9/1986 |
| JP | 1993/5-33788 | 5/1993 |
| JP | 06304338 A * | 11/1994 |

OTHER PUBLICATIONS

Patent Abstracts of Japan, JP-07-289743, Nov. 7, 1995.
Patent Abstracts of Japan, JP-08-309037, Nov. 26, 1996.
Patent Abstracts of Japan, JP-2000-061152, Feb. 29, 2000.
Patent Abstracts of Japan, JP-2001-191276, Jul. 17, 2001.

* cited by examiner

*Primary Examiner*—Derris H. Banks
*Assistant Examiner*—Faye Francis
(74) *Attorney, Agent, or Firm*—Dickstein Shapiro Morin & Oshinsky LLP

(57) ABSTRACT

A skin application structure for bodies that gives a sense of closeness to human, does not cause damage to the surrounding environment, is easily maintained, and does not exert any load to the movable portion is provided. A flexible skin is detachably applied on the surface of the casings of the body including movable portions and immovable portions.

15 Claims, 11 Drawing Sheets

SKIN APPLICATION STRUCTURE FOR ROBOTS AND A ROBOT HAVING SUCH A STRUCTURE

BACKGROUND OF THE INVENTION

This Application claims the benefit of JP 315,521/2001 filed Oct. 12, 2001 the disclosure of which is incorporated herein by reference in its entirety.

1. Field of the Invention

The present invention relates to a skin application structure for robots and a robot having such a structure in the shape of animals, plants, insects, and tentacles regardless of reality or unreality, and being used in a human-centered environment such as a factory or a home.

2. Description of the Related Art

Since the robot in the related art exposes the outer surface of its casing formed of metal or resin, when it falls down or runs into something, it may injure or cause damage to the surrounding objects or human. In addition, since the casing or the mechanical element is exposed, the appearance is crude and harsh to the touch, and thus it does not give a sense of closeness and warmth. Even when it had a high-quality finished form and made various actions to shorten mental distance to humans, there were many women and aged persons who did not show any interest in the robot that exposes the casing or the mechanism.

There are animal toys having a soft skin like a stuffed animal applied thereon. However, when such a skin is applied on the robot, maintenance of the robot cannot be conducted. In addition, the skin of the stuffed animal applied to the robot body exerts too much load on the movable portion thereof, which disadvantageously results in reducing the driving force.

SUMMARY OF THE INVENTION

Accordingly, it is an object of the present invention to provide a skin application structure for robots and a robot having the same structure which gives a sense of closeness and warmth to humans, does not cause damage to the surrounding environment, is easily maintained, and does not exert any load on the movable portion.

In order to solve the problems described above, according to the invention, a flexible skin is detachably applied to the surface of the casing of the robot body including a movable portion and an immovable portion.

Since the skin is applied to the surface of the casing of the robot body, and thus the casing and the mechanical elements are covered, it gives a sense of closeness and warmth to humans and does not cause damage to the surrounding environment. Since the skin is detachably designed, it can be removed from the casing for maintenance services, which allows easy and occasional maintenance. Further, since the skin has flexibility, it does not exert too much load on the movable portion, which prevents the reduction of the driving force.

The flexible skin is preferably formed of material selected from a group including cloth fabric, natural fur, artificial fur, sponge and elastomer. These materials have suitable resilience and good texture, and give a sense of closeness and warmth to humans.

Applying the elastic skin on the movable portion of the robot body and non-elastic skin on the immovable portion of the same allows further reduction of the load on the movable portion. In the case of an animal robot, for example, the movable portion includes the joints of four limbs, the neck and the tail. The immovable portion of the animal robot is the body.

Preferably, the separable members separated from the casing of the robot body are fixed on the inner surface of the skin, and then the separable members are joined to the corresponding portions of the casing when applying the skin to the casing of the robot body. The separable portions here include, in the care of the animal robot, for example, the face portion of the head or tiptoes of the four limbs. Fixing separable members on the inner surface of the skin prevents displacement of the skin at the face portion of the head and tiptoe portions of the four limbs in the case of the animal robot.

Securing the joints between the separable members and the corresponding portions on the casing by means of members constituting a part of the limbs of the robot body inserted from the outside of the skin is preferable in the respect that the attachment can be done easily. The members constituting a part of the limbs of the robot body are, in the animal robot, pads on the tiptoes of four limbs.

Preferably, a connecting portion is provided on the movable portion provided on the separable member and a driving portion for driving the movable portion is provided on the casing, so that the connecting portion of the movable portion is joined to the driving portion when the separable member is joined to the corresponding portion on the casing. This arrangement allows proximity of the movable portion to the skin, and ensures transmission of the power of the driving portion to the movable portion via the connecting portion. The movable portion of the separable member here includes ears on the head, upper and lower eyelids on the face, and lower jaw, for example, in the case of the animal robot.

Preferably, a fixture is attached on the inner surface of the skin with a flexible thread member of a prescribed length so that the fixture can be secured in the corresponding retaining portion on the casing when the skin is applied on the casing of the robot body. This arrangement allows movement of the skin with respect to the casing of the robot body for providing mobility of the skin.

Preferably, an elastic pad is adhered on the surface of the casing and the skin is applied on the pad. This arrangement gives roundness and elasticity to the skin, thus more lifelike feeling to the shape of the limbs is achieved, and pleasant touch for rubbing and hugging is realized.

The skin application structure constructed as described above is preferably applied to animal robots, especially for example, to cats or foxes.

DESCRIPTION OF THE PREFERRED EMBODIMENTS

Figure 1:
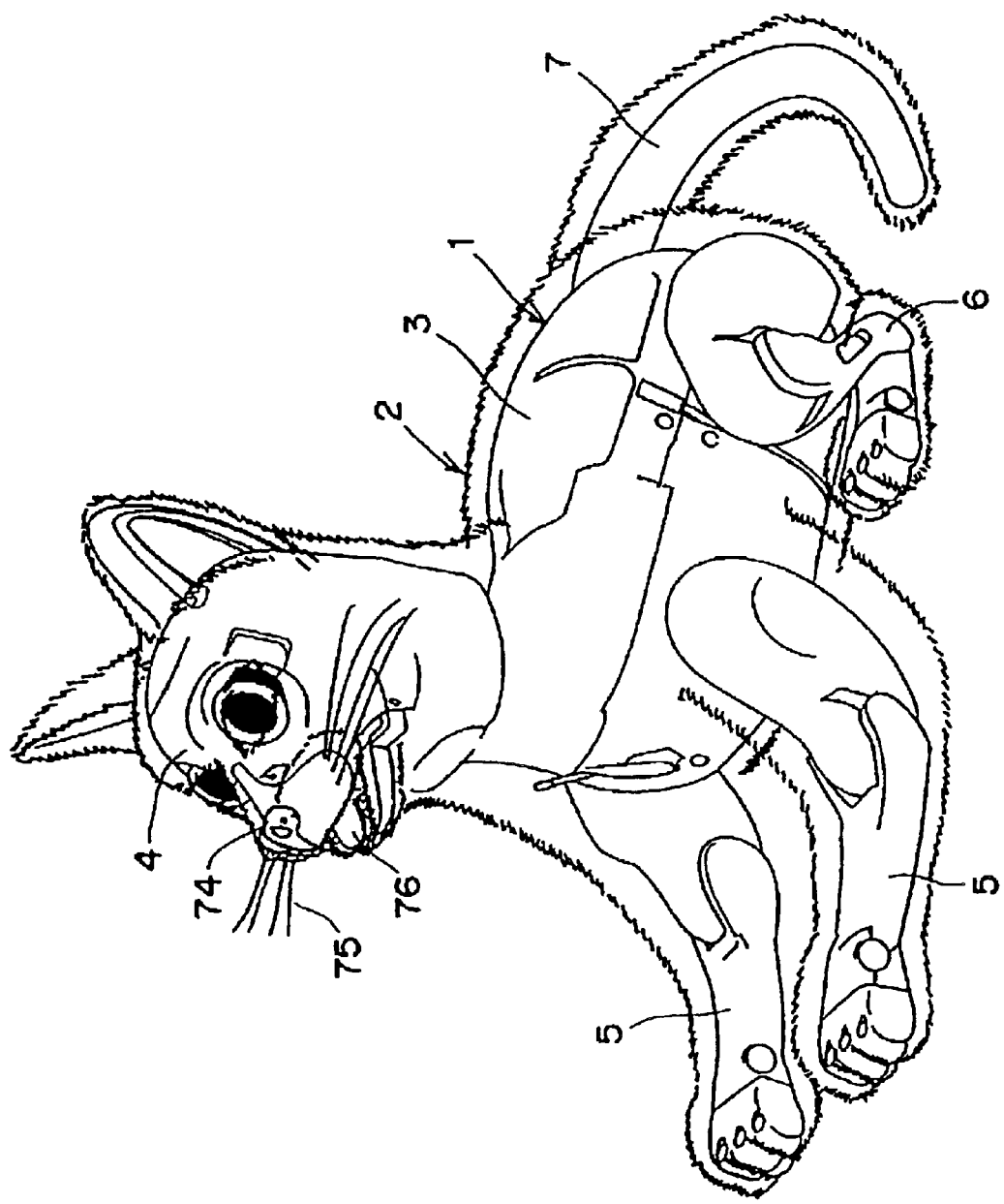
FIG. 1 is a perspective view of an embodiment of a cat robot according to the invention, showing the robot body through the skin.

Referring now to the drawings, embodiments of the present invention will be described.

FIG. 1 is a cat robot provided with an skin application structure according to the invention. The skin application structure of the invention is not limited to the cat shape, and it is also applicable to robots in the shape of animals such as fox, dog, or bird, in the shape of plants such as gourd or apple, in the shape of insect such as caterpillar, in the shape of tentacles such as those of octopus or squid, or of fictional characters.

Figure 2:
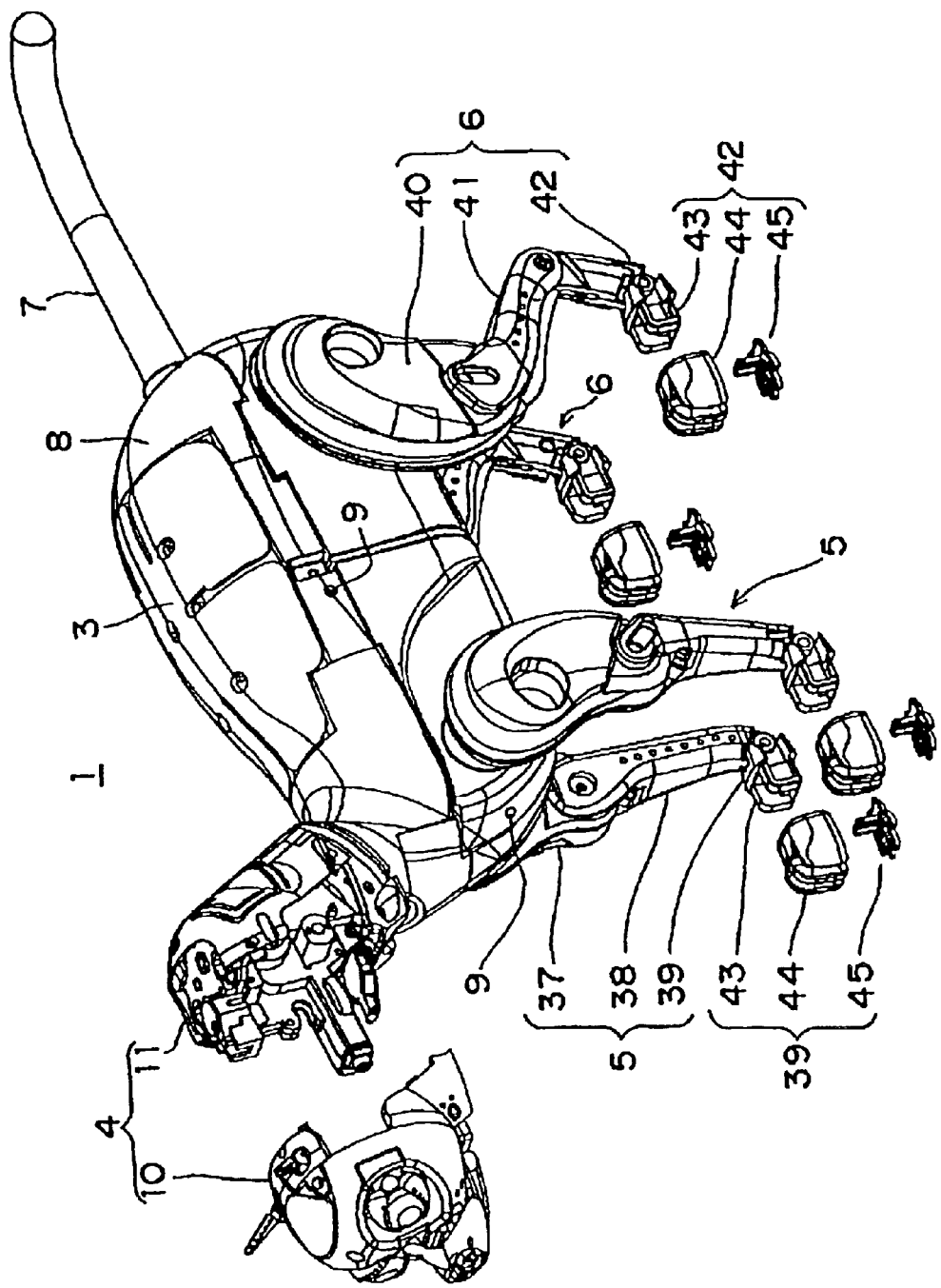
FIG. 2 is an exploded perspective view of the robot body shown in FIG. 1.

The robot shown in FIG. 1 includes a robot body 1 and a skin 2. The robot body 1 includes a body portion 3, a head portion 4, a pair of front leg portions 5, a pair of hind leg portions 6, and a tail portion 7. The body portion 3 includes a drive unit for driving the head portion 4, the pair of front leg portions 5, the pair of hind leg portions 6, and the tail portion 7, a control unit for controlling the drive unit, and a battery for supplying power to the drive unit and the control unit built therein. The body portion 3 is covered by the casing 8 of synthetic resin as shown in FIG. 2, and the casing 8 forms the outer surface of the body of a cat. The casing 8 is formed with five retaining holes 9 in which the fixtures 65, which will be described later, of the skin 2 are secured at the front, rear, left, right and at the belly portion of the casing.

Figure 3:
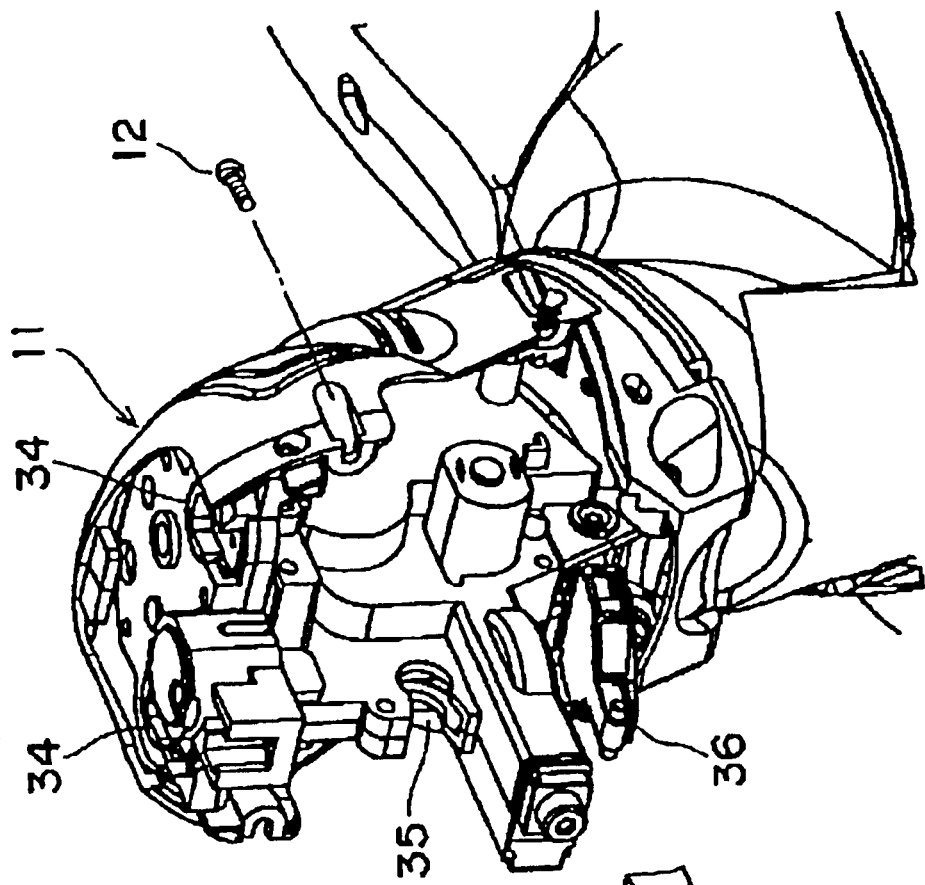
FIG. 3 is an enlarged and exploded perspective view of the head portion shown in FIG. 2.
Figure 3:
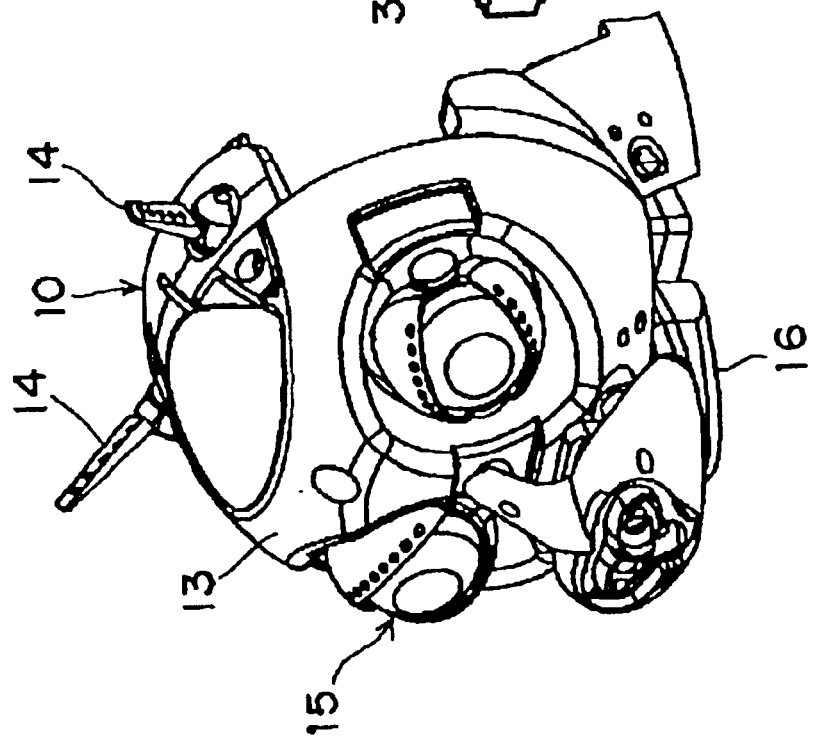

The head portion 4 includes a mask assembly 10 forming the forehead and face, and a base assembly 11 forming the back of the head. The mask assembly 10 is, as shown in FIG. 3, adapted to be separably joined to the base assembly 11 with a screw 12. The mask assembly 10 is constructed by mounting a pair of ears 14, a pair of eye subassemblies 15, and a lower jaw 16 on a casing 13 forming the outer surface of the forehead and the face.

Figure 4:
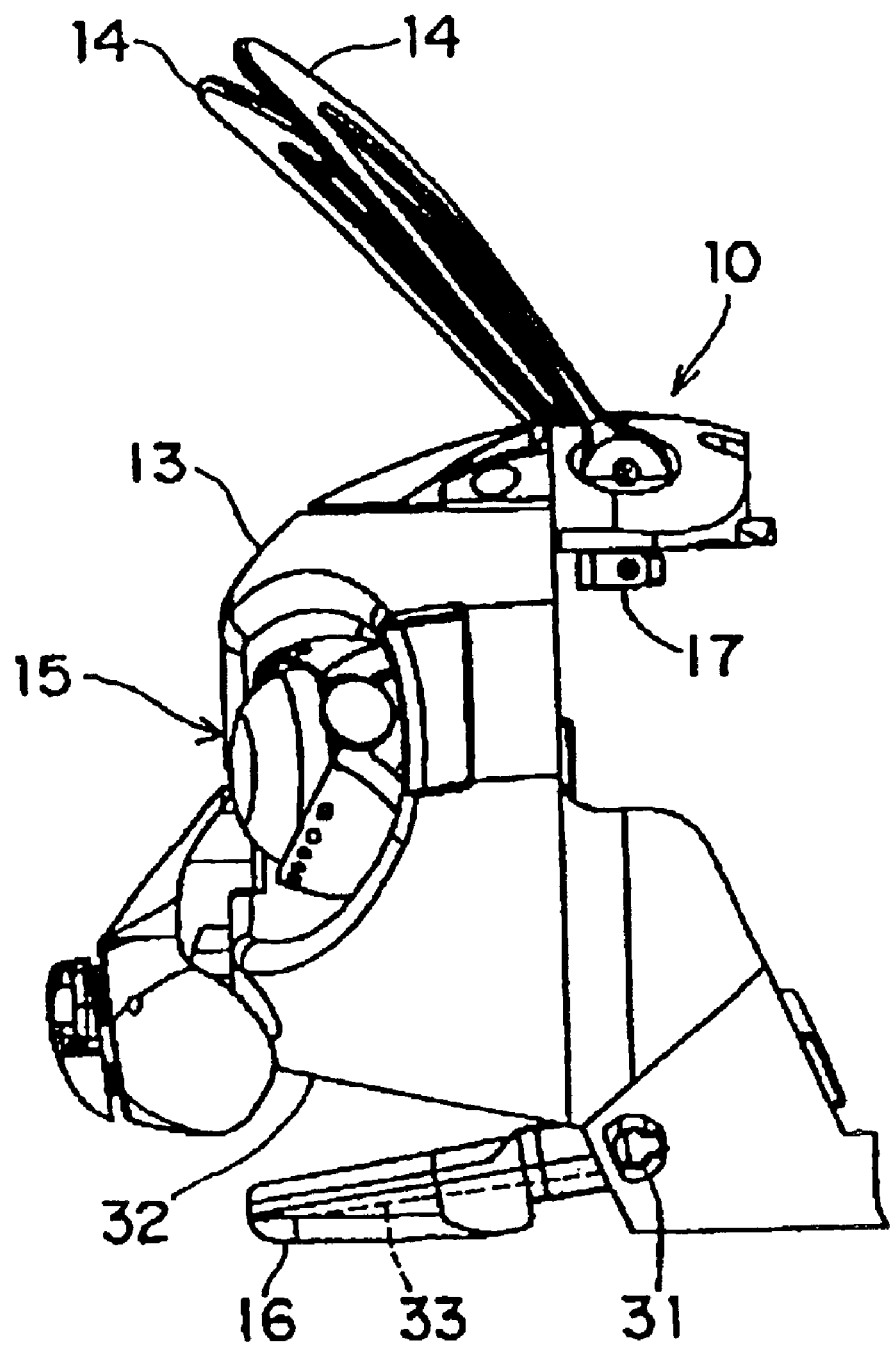
FIG. 4 is a side view of a mask assembly of the head portion shown in FIG. 3.

The pair of ears 14 are, as shown in FIG. 4, mounted on the casing 13 so as to be rotatable about the connecting shaft 17 by approximately 90 degrees, so that the ears can be moved between the forwardly inclined standing position and the lying position by rotating the connecting shaft 17.

Figure 5:
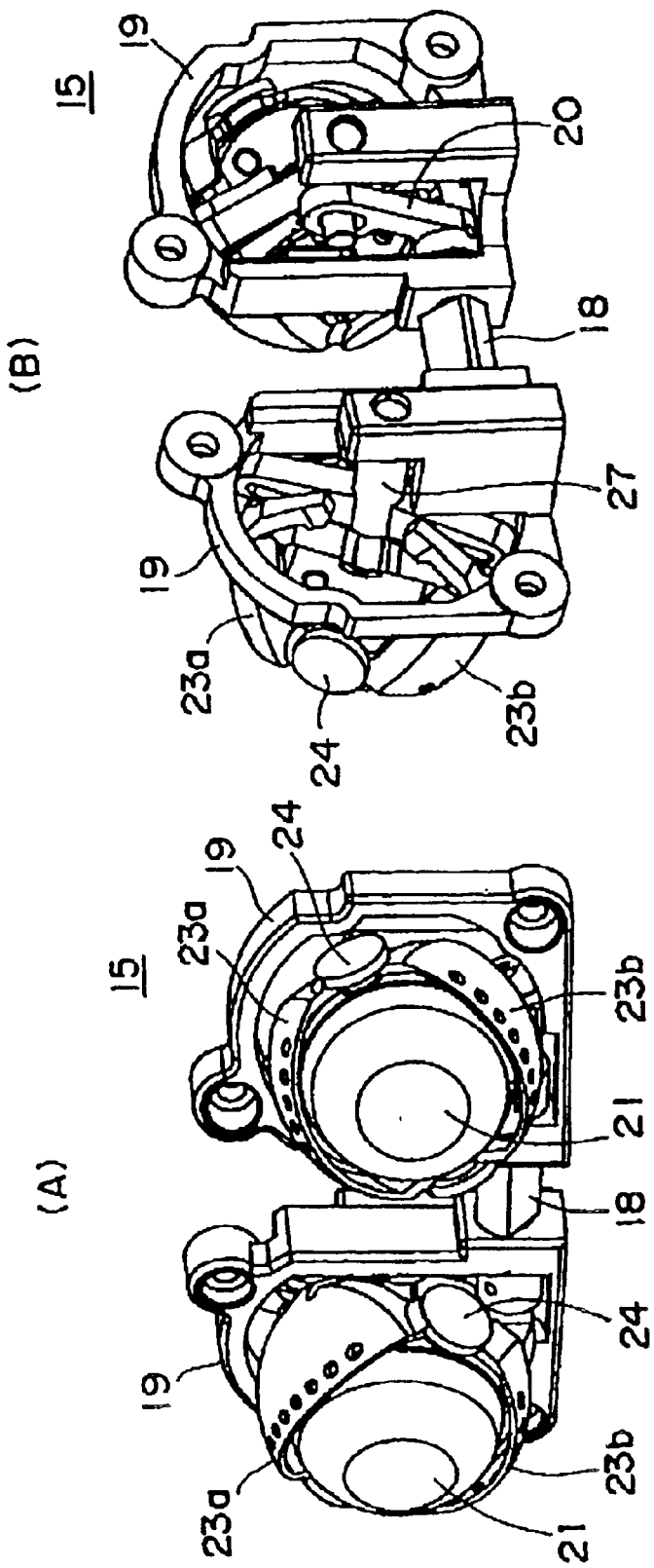
FIG. 5A is a perspective view of a pair of eye subassemblies to be mounted on the mask assembly shown in Pi cj. 3, when viewed obliquely from the front.
FIG. 5B is a perspective view of a pair of eye subassemblies to be mounted on the mask assembly shown in FIG. 3, when viewed obliquely from the rear.
Figure 6:
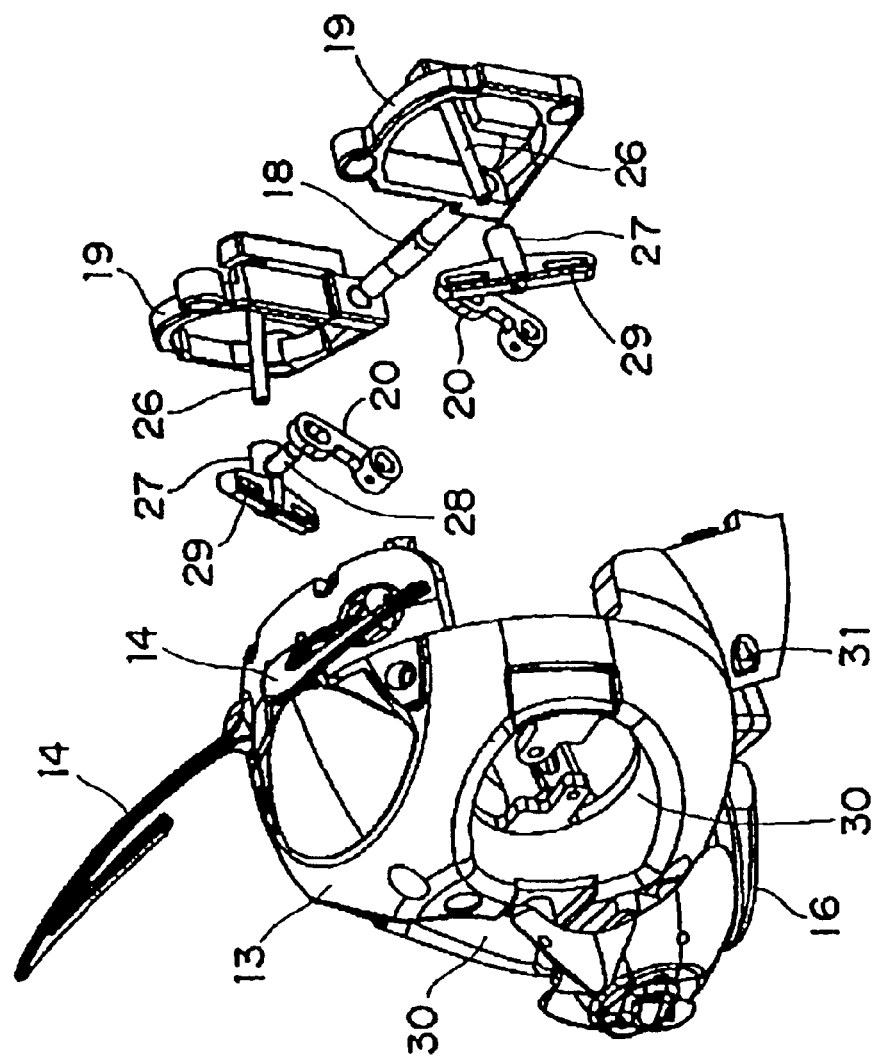
FIG. 6 is an exploded perspective view of the pair of eye subassemblies shown in FIG. 3.
Figure 6:
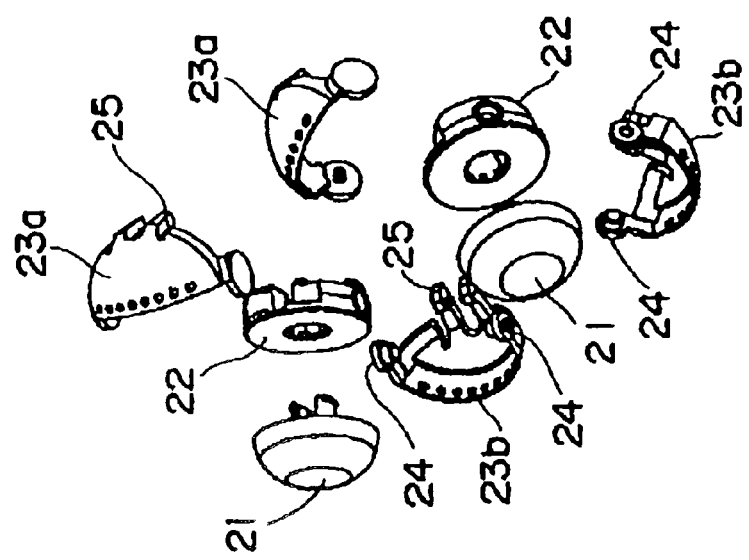
Figure 7:
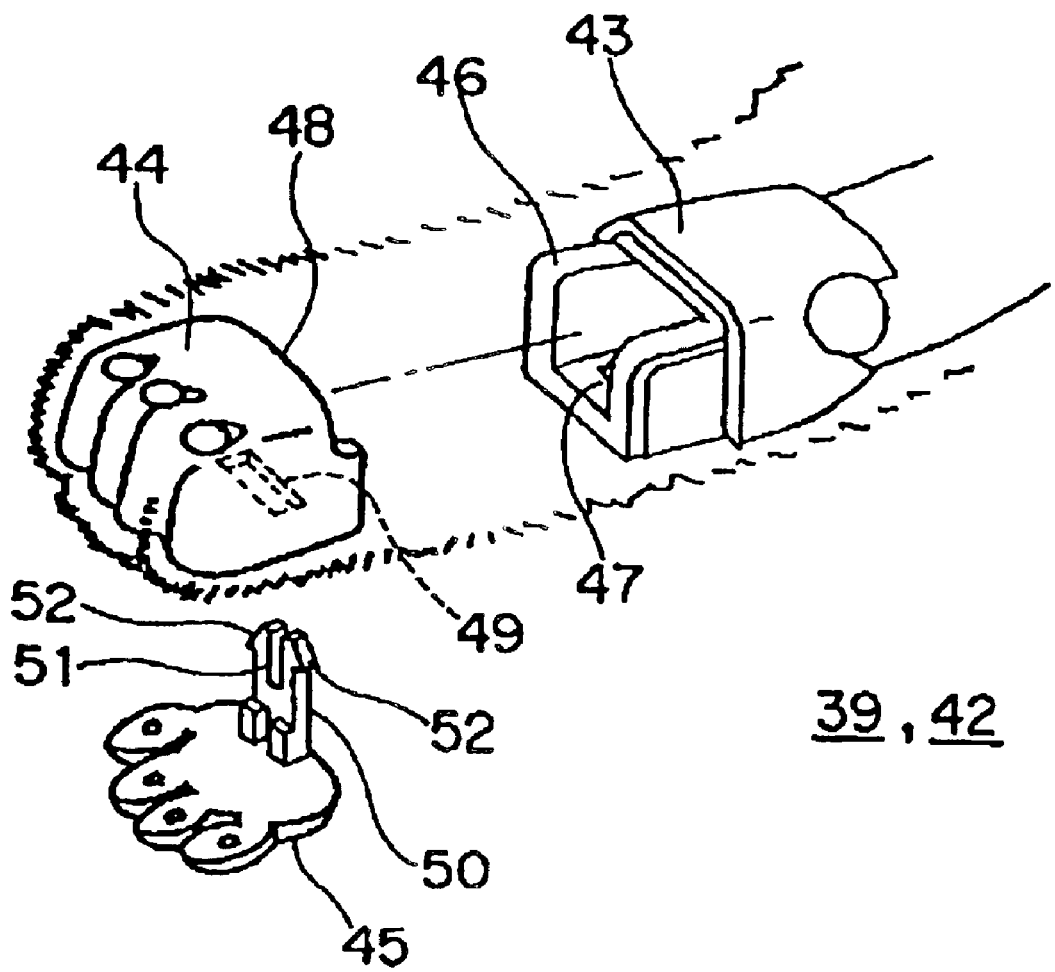
FIG. 7 is an exploded perspective view of the legs shown in FIG. 2.

The pair of eye subassemblies 15 includes, as shown in FIG. 5 and FIG. 6, a pair of square frames 19 connected by the connecting shaft 18. The connecting shaft 18 is fixed with levers 20 on both ends. An eyeball 21 is fixedly mounted on each frame 19 via a base 22, and upper and lower eyelids 23a, 23b for opening and closing the eyeball 21 are rotatably mounted on the base 22 on both sides thereof with a shaft 24. The upper and lower eyelids 23a, 23b are formed with a pair of projections 25. Upper and lower eyelids 23a, 23b are further formed with a plurality of holes. A sliding shaft 26 extending in the fore-and-aft direction is provided between the base 22 and the frame 19 f each eyeball 21 and a T-shaped sliding member 27 is slidably supported on the sliding shaft 26. The sliding member 27 is formed with a projection 28, and the projection 28 is rotatably joined to the lever 20 of the connecting shaft 18. The sliding member 27 is formed with elongated holes 29 on both wings thereof, and the elongated holes 29 are connected to the projections 25 on the upper and lower eyelids 23a, 23b via pins that are not shown in the figure.

The pair of eye subassemblies 15 is attached inside the casing 3 in such a manner that the pair of eyeballs 21 and the upper and lower eyelids 23a, 23b are accommodated into eyeholes 30 formed on the casing 13. When the connecting shaft 18 rotates, the levers 20 rotate with the connecting shaft 18 as a single unit, and the sliding member 27 slides on the sliding shaft 26 in the fore-and-aft direction. Consequently, the upper and lower eyelids 23a, 23b open and close with rotative motion. That is, the pair of eye subassemblies 15 including eyeballs 21 and eyelids 23a, 23b are operated using a rotative motion mechanism.

The lower jaw 16 is, as shown in FIG. 4, rotatably mounted on the casing 13 with a shaft 31, and rotates between the position away from the upper jaw 32 formed integrally with the casing 13 and the position in the proximity of the upper jaw 32 to open and close the mouth. The lower jaw 16 is formed with an engaging groove 33 on the lower surface thereof.

As shown in FIG. 3, the base assembly 11 of the head portion 4 includes a pair of ear driving unites 34, a pair of eye driving units 35, and a lower jaw driving unit 36. When the base assembly 11 is joined to the mask assembly 10, the pair of ear driving units 34 engage the connecting shaft 17 (see FIG. 4) of the pair of ears 14 on the mask assembly 10 to rotate the connecting shaft 17 interlockingly, the pair of eye driving units 35 engage the connecting shaft 18 (see FIG. 5 ) of the pair of eye subassemblies 15 to rotate the connecting shaft 18 interlockingly, and the lower jaw driving unit 36 engages the engaging groove 33 (see FIG. 4) on the lower jaw 16 to swing the lower jaw 16 interlockingly. The base assembly 11 is rotatable in the vertical direction and in the lateral direction with respect to the body portion 3 by means of a drive unit that is not shown.

As shown in FIG. 2, the pair of front leg portions 5 each include upper arms 37 rotatably connected at the proximal end thereof to the body portion 3, a front arm 38 rotatably connected to the distal end of the upper arm 37, and a foot 39 rotatably connected to the distal and of the front arm 38, so that a standing posture and a sitting posture are achieved. Likewise, the pair of hind legs 6 each includes an upper leg 40 rotatably connected at the proximal end thereof to the body portion 3, a lower leg 41 rotatably connected to the distal end of the upper leg 40, and a foot 42 rotatable connected to the distal end of the lower leg 41, so that a standing posture and a sitting posture are achieved.

Figure 8:
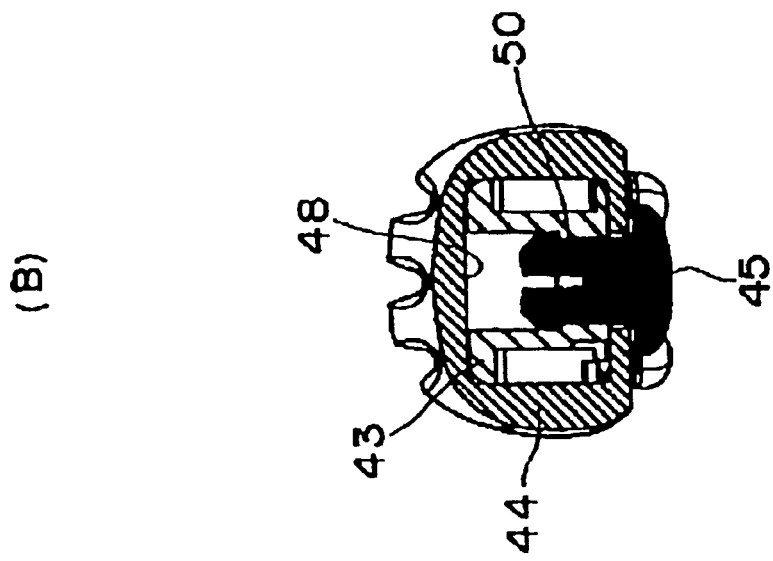
FIG. 8A is a cross sectional view showing an assembled state of legs shown in FIG. 2.
FIG. 8B is a cross sectional view taken along the line 8B—8B in FIG. 8A.
Figure 8:
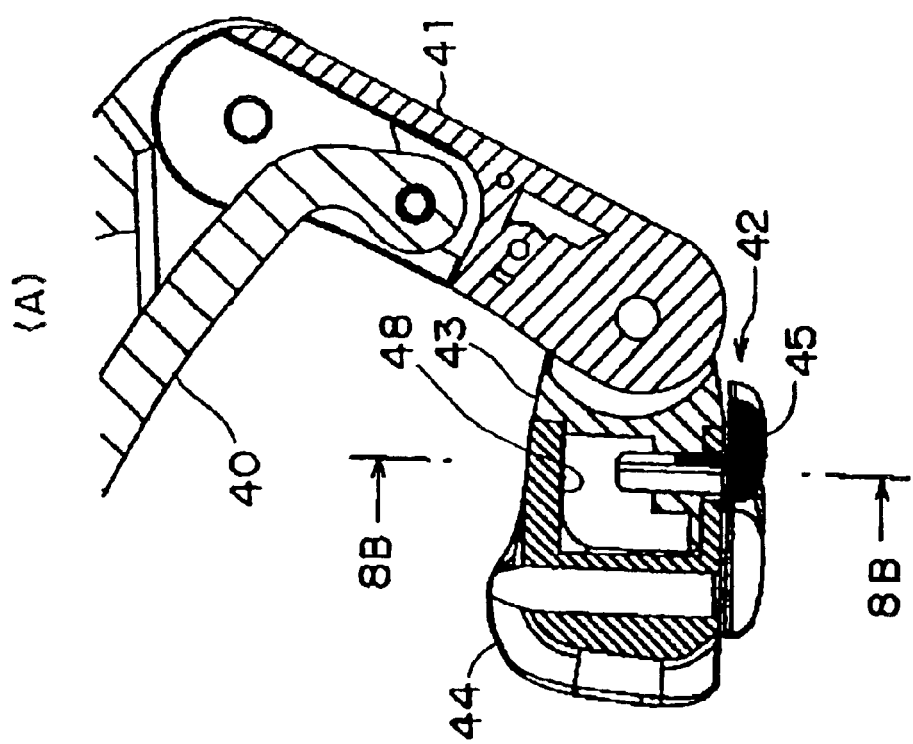

The feet 39, 42 of the front legs 5 and hind legs 6 each include a base portion 43, a claw portion 44, and a pad 45. The base portion 43 includes a fitting portion 46 of U-shaped cross section at the distal end thereof, and is formed with a square retaining hole 47 on the bottom surface thereof. The claw portion 44 is formed of flexible material such as rubber, and formed at the rear end thereof with a square fitting hole 48 for receiving the fitting portion 46 of the base portion 43 as shown in FIG. 8. The claw portion 44 is formed at the bottom thereof with a square hole 49 that aligns with the retaining hole 47 on the base portion 43 when the fitting portion 46 of the base portion 43 is fitted in the fitting hole 48 of the claw portion 44. The pad 45 has an attachment shaft 50 of square cross section that is to be inserted into the hole 49 of the claw portion 44 and the retaining hole 47 of the base portion 43 with the fitting portion 46 of the base portion 43 fitted into the fitting hole 48 of the claw portion 44. The attachment shaft 50 is provided with lateral resiliency in the direction perpendicular to the shaft by means of a slit 51 formed on the tip thereof. The tip of the attachment shaft 50 is formed with claws 52 to be retained in the retaining hole 47 on the base portion.

The tail portion 7 has flexible construction, and is attached at the proximal end to the back of the body portion 3, and is adapted to be wagged in the vertical and lateral directions by pulling three wires, not shown, inserted through the inside as needed.

Figure 9:
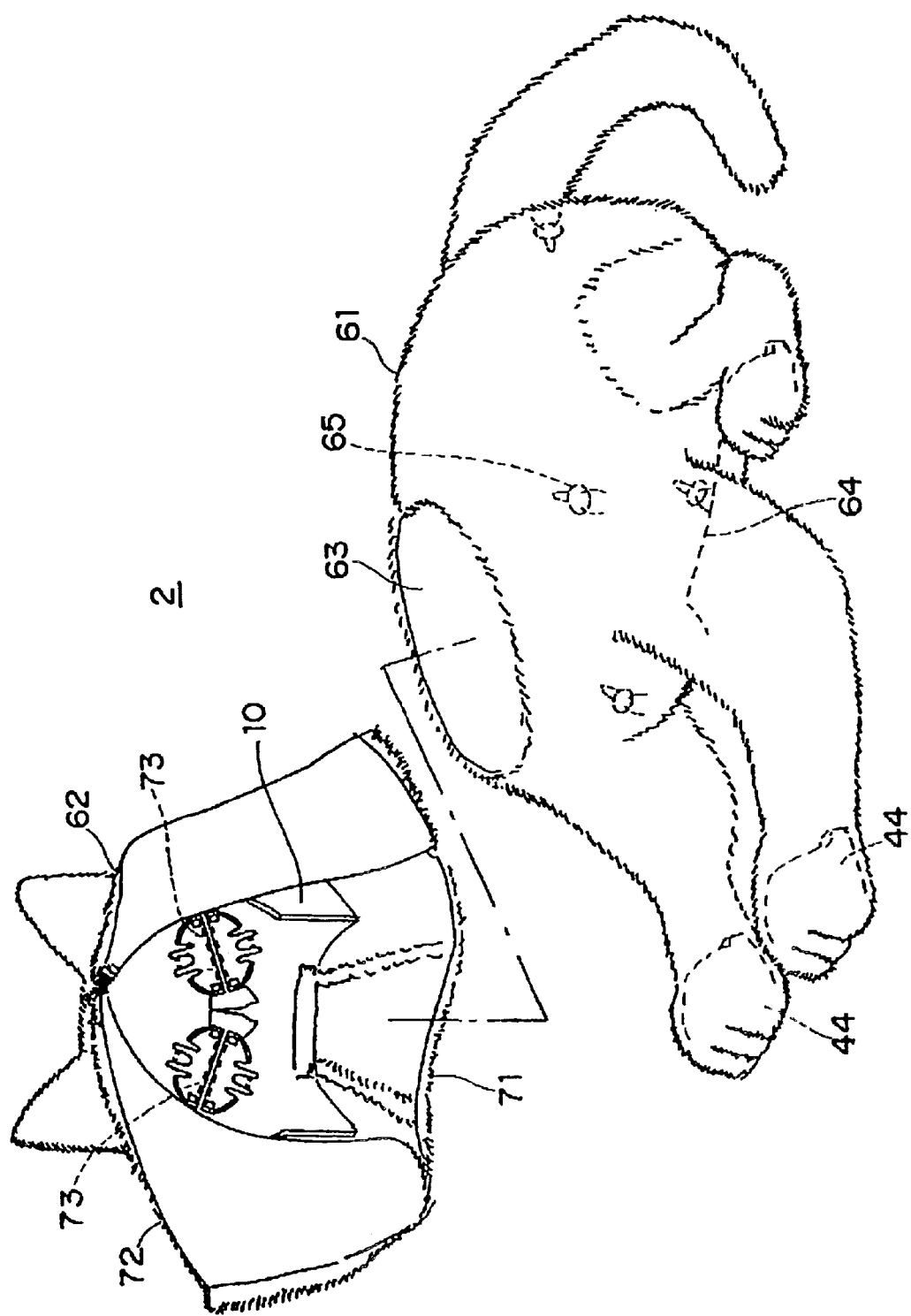
FIG. 9 is an exploded perspective view of the skin shown in FIG. 11

On the other hand, the skin 2 includes, as shown in FIG. 9, a body skin 61 that is produced so as to cover the body portion 3, the pair of front leg portions 5, the pair of hind leg portions 6, and the tail portion 7 of the robot body 1 in advance, and a head skin 62 that is produced for covering the head portion 4 in advance. Though the skin 2 is formed of artificial fur in this embodiment, it is not limited thereto, and cloth fabric, natural fur, sponge, elastomer or other flexible materials can be applied.

Referring to FIG. 9, the body skin 61 includes an opening 63 at the neck portion, and an opening 64 that is openable and closable by Velcro fastener or the like at the position corresponding to the belly of the body portion 3, so that it can be applied to and detached from the body portion 3, the pair of front leg portions 5, the pair of hind leg portions 6, and the tail portion 7 of the robot body 1 through the opening 64. The opening 64 may also be opened and closed when batteries stored in the body portion are exchanged.

The portions of the body skin 61 corresponding to the movable portions of the robot body 1, (that is, the skin corresponding to the joint portions of the neck portion), the pair of front leg portions 5, the pair of hind leg portions 6, and the tail portion 7 are formed of skin which is elastic in the direction of movement, while the portions corresponding to the immovable portions, (that is, the portions other than the above described movable portions) are formed of non-elastic skin. The elasticity of the skin 2 may be achieved by employing material including elastic fiber for at least one of warp and weft that constitute the skin 2.

The claw portion 44 is fixed in advance by adhesion or sewing on the portion of the inner surface of the body skin 61 corresponding to the claw portions 44 of the pair of front legs 5 and the pair of hind legs 6.

Figure 10:
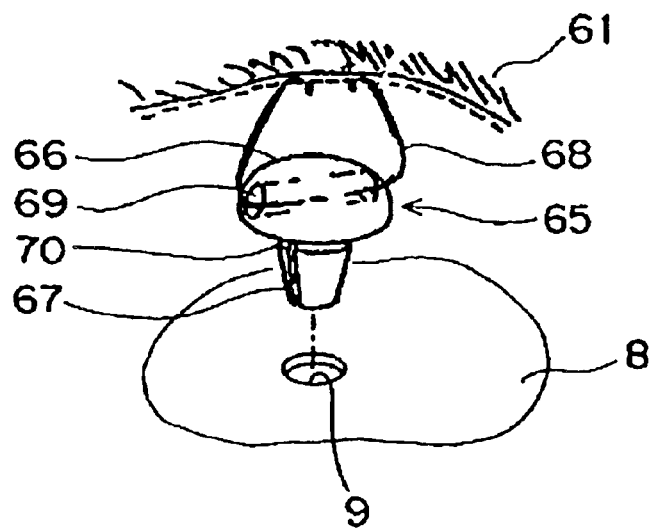
FIG. 10 is a perspective view of a fixture mounted on the skin shown in FIG. 9.
Figure 11:
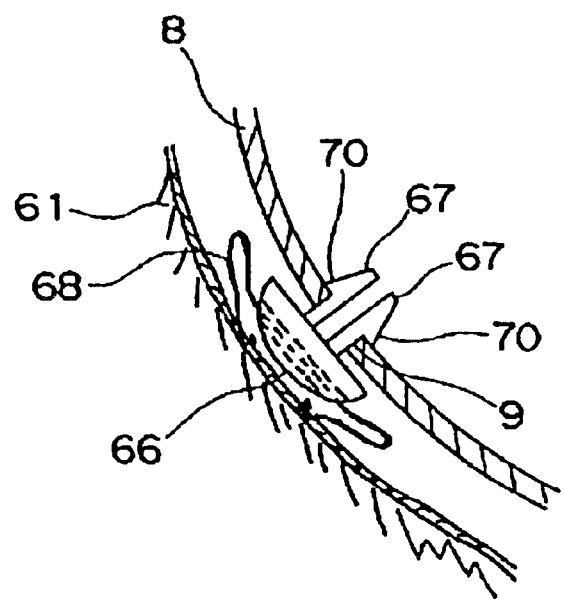
FIG. 11 is a cross sectional view showing a state in which the fixture shown in FIG. 10 is attached on the casing of the body portion.

Fixtures 65 are attached on the inner surface of the body skin 61, and more specifically, at the positions corresponding to the retaining holes 9 formed on the body portion 3 of the robot body 1 at the left, right, front, rear, and at the belly of the casing 8. The fixture 65 includes a head portion 66, and a pair of resilient leg portions 67 as shown in FIG. 10 and FIG. 11. The head portion 66 is formed with a hole 69 through which a prescribed length of thread 68 is passed. The pair of leg portions 67 each has a claw 70 to be engaged the inner edge of the retaining hole 9. The fixture 65 is attached so as to stay away from the inner surface of the body skin 61 by a prescribed distance via the thread 68 passed through the hole 69 of the head portion 66.

The head skin 62 includes, as shown in FIG. 9, an opening 71 for the neck and a slit 72 formed from the opening 71 to the back of the head. It is adapted to cover the pair of ears 14, the forehead, the face, and the lower jaw 16 of the mask assembly 10 of the head portion 4, and cover the back of the head of the base assembly 11. It is formed with holes 73 at the positions corresponding to the pair of eyeballs 21. As shown in FIG. 1, it includes a nose tip 74 attached at the position corresponding to the nose, whiskers 75 attached at the position downwardly of the nose on both sides, and a mouthpiece 76 having imitation teeth, a tongue, and the surface of the mouth cavity attached between the upper jaw 32 and the lower jaw 16. The face has a coat of fur similar to a real cat and trimmed as needed.

The face has a good coat of fur as a real cat and trimmed as needed

The portions of the head skin 62 corresponding to the movable portions of the mask assembly 10, (that is, the bases of the pair of ears 14, the upper and lower eyelids 32$a$, 32$b$, and the base of the lower jaw 16) are formed of elastic skin, and the portions corresponding to the immovable portions are formed of nonelastic skin. Elasticity of the skin may be achieved by employing material including elastic fiber for at least one of warp and weft that constitutes the skin.

The head skin 62 is applied on the mask assembly 10 of the head portion 4 of the robot body 1 in advance. The edges of the holes 73 on the head skin 62 corresponding to the pair of eyeballs are fixed on the upper and lower eyelids 23$a$, 23$b$ and the portion corresponding to the lower jaw 16 is fixed to the lower jaw 16 in advance by adhesion or sewing.

A method of applying the skin 2 constructed as described above on the robot body 1 will now be described.

In a first place, in a state in which the pair of front leg portions 5 and the pair of hind leg portions 6 of the robot body 1 are bent and the tail portion 7 is bent at the base and laid along the body portion 3, the opening 64 of the body skin 61 is opened and the robot body 1 is put inside through the opening 64, while the base assembly 11 of the head portion 4 is exposed from the opening 63, and the pair of front leg portions 5, the pair of hind leg portions 6, and the tail portion 7 are fitted as appropriate. Subsequently, the pair of front leg portions 5 and the pair of hind leg portions 6 of the robot body 1 are straightened and inserted into the corresponding portions, and then the fitting portions 46 of the base portions 43 at the tips thereof are fitted into the fitting holes 48 of the claw portions 44 and pad portions 45 that are fitted together and then adhere on the inner surface of the body skin 61 in advance. Then, the tail portion 7 of the robot body 1 is straightened and inserted into the corresponding portion. Subsequently the fixtures 65 on the inner surface of the body skin 61 are inserted and secured in the retaining hole 9 on the body portion 3 as shown in FIG. 11. Further, the attachment shaft 50 of the pad 45 is inserted into the square hole 49 of the claw portion 44 and the retaining hole 47 of the base portion 43 fitted with each other from the outside of the body skin 61 and secured in the retaining hole 47 of the base portion 43. This prevents the claw portion 44 from being detached from the base portion 43.

Subsequently, the opening 71 and the slit 72 of the head skin 62 having a mask assembly 10 attached on the inner surface are opened, and applied on the base assembly 11 of the head portion 4. At this time, the mask assembly 10 is pressed against the base assembly 11 to join with each other with the lower jaw 16 of the mask assembly 10 being closed, and fixed with a screw 12. This allows the connecting shafts 17 of the pair of ears 14, the connecting shaft 18 of the pair of eye subassemblies 15, and the engaging groove 33 of the lower jaw 16 of the mask assembly 10 to be joined to the base assembly 11 having the ear driving unit 34, the eye driving unit 35, and the lower jaw driving unit 36, which respective drive units allow the pair of ears, the pair of eye subassemblies and the lower jaw to be driven/moved.

As a next step, the slit 72 at the neck portion of the head skin 62 is stitched together, and the opening 71 at the neck portion of the head skin 62 and the opening 63 of the neck portion of the body skin 61 are stitched together. This allows the head skin 62 and the body skin 61 to be completely applied on the robot body 1.

In this manner, the invention as exemplified by the cat robot, with the skin 2 applied on the surface of the casings 8, 13 of the robot body 1, gives the user a sense of closeness and warmth, in comparison with the robot of the related art which exposes the casing or the mechanical elements, and further it does not cause damage to the surrounding environment even when it falls down or runs into something around. Further, since the skin 2 has flexibility, it does not exert too much load to the movable portion of the robot body 1, which prevents reduction of the driving force. Especially since the skin 2 of the movable portion has elasticity, a load applied on the movable portion may be further reduced. In addition, the body skin 61 is allowed to move by a prescribed extent with respect to the casing 8 of the robot body 1 by means of thread 68 of the fixtures 65 as shown in FIG. 11, the user can pinch only the skin or grab it by the neck as if it is a real cat.

With the invention as exemplified by the cat robot, since the claw portions 44 are fixed on the inner surface of the body skin 61 in advance, and the mask assembly 10 is fixed on the inner surface of the head skin 62 in advance, displacement of the skins 61, 62 can be prevented.

Further, each movable portion of the mask assembly 10, that is, the pair of ears 14, the upper and lower eyelids 23a, 23b, and the lower jaw 16 are adhered to the head skin 62 in mutual close proximity, and they are interlocked with the respective driving units 34, 35, 36 of the base assembly 11, the power of the driving units 34, 35, 36 are reliably transmitted to the respective movable portions, and thus the robot with the skin 62 thus attached can be moved as if it is real.

In order to remove the skin 2 from the robot body 1, the pads 45 are disconnected, the base portions 43 are disconnected from the claw portions 44, the pair of front legs 5, the pair of hind legs 6, and the tail portion 7 are drawn out from the skin, and detach the fixtures 65 to expose the body portion 3. In this state, the screw 12 at the neck portion is removed, and the mask assembly 10 is separated from the base assembly 11 to remove the skin 2 from the robot body 1. The process of removing the skin 2 described above is reversed. In this manner, the skin 2 can be applied and removed easily so that exchange of battery or maintenance can be performed occasionally.

Figure 12:
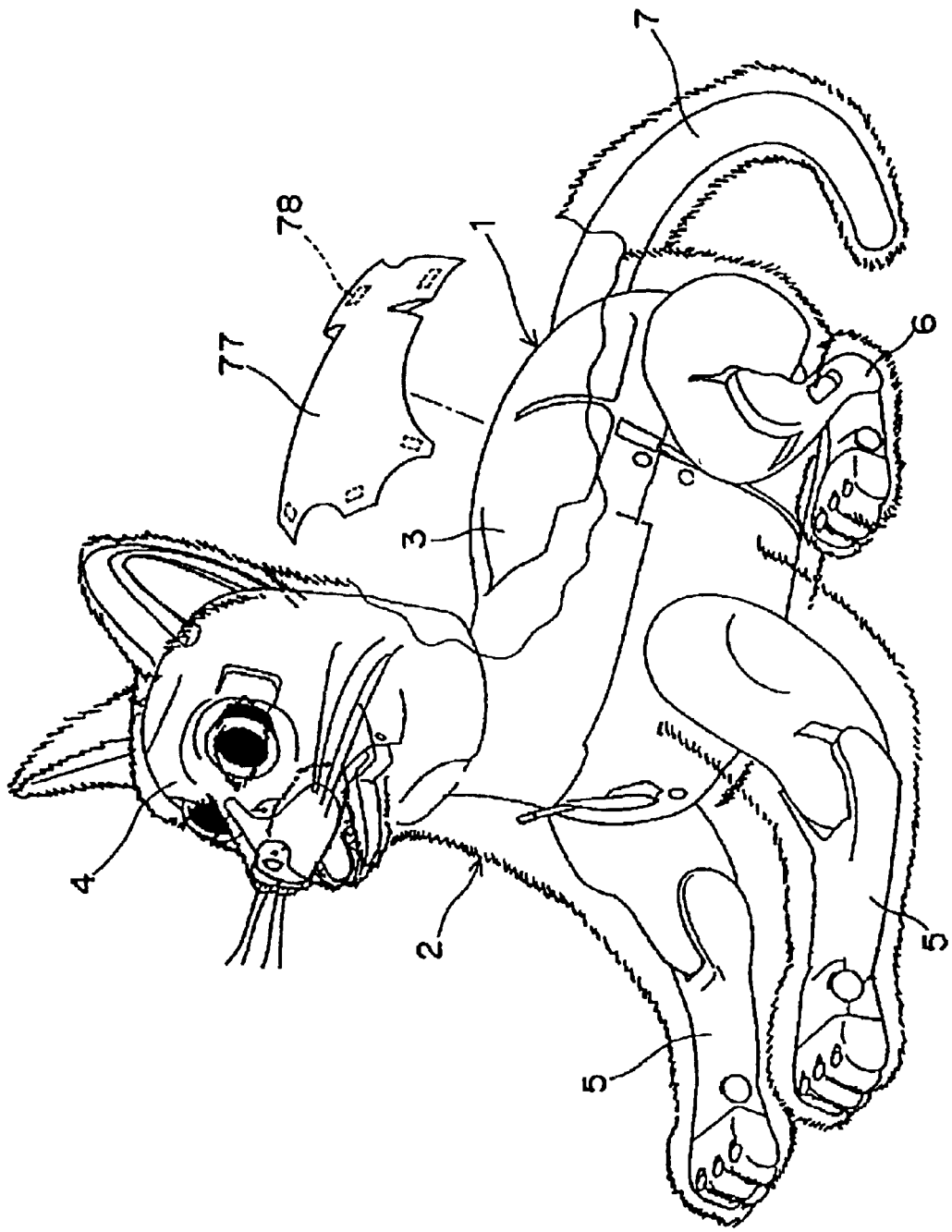
FIG. 12 is a perspective view of another embodiment of the cat robot of the invention, showing a state in which the skin is broken at the back portion and the pad is removed, showing the robot body through the skin.

FIG. 12 shows a case in which an elastic pad 77 is adhered on the surface of the back portion of the casing 8 of the robot body 1 with double-faced tape 78, and the skin 2 is applied to the pad 77. This arrangement gives roundness and elasticity on the skin 2, thus more lifelike feeling to the shape of the cat's limbs is achieved, and pleasant touch for rubbing or hugging is realized. It is also possible to apply the same type of pad on the portions that are liable to be touched by the user, for example, the pair of ears 14, the forehead, the face, and the lower jaw 16 of the mask assembly 10, the belly portion of the body portion 3, the pair of front legs 5, and the pair of hind legs 6. The types or physical conditions of the cat may easily be changed by changing the pad's size for each robot.

As is clear from the description above, according to the present invention, since the skin is applied on the surface of the casing of the robot body having movable portions and immovable portions, the casing and the mechanical elements are covered, and thus it gives a sense of closeness and warmth to humans, especially to women and aged persons, and in addition, it does not cause damage to the surrounding environment. Since the skin is detachably applied, it can be removed from the casing for maintenance, and thus maintenance service can easily be performed occasionally. In addition, since the skin has flexibility, it does not exert too much load on the movable portions, which prevents reduction of the driving force.

What is claimed is:

1. An eye subassembly comprising:
   a frame;
   an eyeball;
   a movable upper eyelid; and
   a movable lower eyelid, said eyeball, said upper eyelid and said lower eyelid being located within a perimeter of said frame, said frame being connected to a second eye subassembly via a connecting shaft having a first end and a second end.

2. The eye subassembly according to claim 1, wherein said eye subassembly is operated using a rotative motion mechanism.

3. The eye subassembly according to claim 2, wherein said eye subassembly is attached inside a casing such that said eye ball, said upper eyelid and said lower eyelid are accommodated into an eyehole formed in said casing.

4. An eye subassembly comprising:
   an eyeball;
   an upper eyelid; and
   a lower eyelid, said eye subassembly being connected to a second eye subassembly via a connecting shaft having a first end and a second end, said connecting shaft fixed with a first lever at said first end of said connecting shaft and a second lever at said second end of said connecting shaft.

5. The eye subassembly according to claim 4, wherein said eyeball is fixedly mounted on a frame via a base.

6. The eye subassembly according to claim 5, wherein said upper eyelid and said lower eyelid for opening and closing said eyeball are rotatably mounted on said base with a shaft.

7. The eye subassembly according to claim 6, wherein said upper eyelid and said lower eyelid are formed with a pair of projections.

8. The eye subassembly according to claim 7, further comprising a sliding shaft, said sliding shaft extending in a fore-and-aft direction, said sliding shaft provided between said base and said frame of said eyeball.

9. The eye subassembly according to claim 8, further comprising a T-shaped sliding member slidably supported on said sliding shaft.

10. The eye subassembly according to claim 9, wherein said T-shaped sliding member is formed with a projection, said projection rotatably joined to said first lever and said second lever fixed to said connecting shaft.

11. The eye subassembly according to claim 10, wherein said T-shaped sliding member further comprises a pair of wings, each of said pair of wings being formed with elongated holes, said elongated holes being connected to said projections of said upper eyelid and said lower eyelid via pins.

12. The eye subassembly according to claim 9, wherein said T-shaped sliding member slides on said sliding shaft.

13. The eye subassembly according to claim 4 wherein said connecting shaft and said first lever operate as a single unit.

14. The eye subassembly according to claim 4 wherein said connecting shaft and said second lever operate as a single unit.

15. The eye subassembly according to claim 4 wherein said connecting shaft and said first lever and said second lever operate as a single unit.

* * * * *